(12) United States Patent
Li et al.

(10) Patent No.: US 12,644,843 B2
(45) Date of Patent: Jun. 2, 2026

(54) TRANSIENT ABSORPTION SPECTROMETER USING EXCITATION BY PULSE CURRENT

(71) Applicant: University Of Science And Technology Of China, Hefei (CN)

(72) Inventors: Bo Li, Hefei (CN); Beibei Tang, Hefei (CN); Fengjia Fan, Hefei (CN); Jiangfeng Du, Hefei (CN)

(73) Assignee: University Of Science And Technology Of China, Hefei (CN)

( * ) Notice: Subject to any disclaimer, the term of this patent is extended or adjusted under 35 U.S.C. 154(b) by 380 days.

(21) Appl. No.: 18/256,807

(22) PCT Filed: Jan. 12, 2021

(86) PCT No.: PCT/CN2021/071264
§ 371 (c)(1),
(2) Date: Jun. 9, 2023

(87) PCT Pub. No.: WO2022/121082
PCT Pub. Date: Jun. 16, 2022

(65) Prior Publication Data
US 2024/0027351 A1 Jan. 25, 2024

(30) Foreign Application Priority Data
Dec. 11, 2020 (CN) .......................... 202011470295.0

(51) Int. Cl.
*G01N 21/66* (2006.01)
(52) U.S. Cl.
CPC ... *G01N 21/66* (2013.01); *G01N 2201/06113* (2013.01)
(58) Field of Classification Search
CPC ... G01N 21/636; G01N 21/66; G01N 21/3581
See application file for complete search history.

(56) References Cited

U.S. PATENT DOCUMENTS 8,399,835 B2 * 3/2013 Hashimoto ........ G01N 21/3581
250/336.1
8,934,089 B2 1/2015 Cho et al.
(Continued)

FOREIGN PATENT DOCUMENTS

CN 102590159 A 7/2012
CN 108827914 A 11/2018
(Continued)

OTHER PUBLICATIONS

"Japanese Application No. 2023-535048, Notice of Reasons for Refusal dated Jun. 21, 2024", (Jun. 21, 2024), 8 pgs.
(Continued)

*Primary Examiner* — Lam S Nguyen
(74) *Attorney, Agent, or Firm* — Schwegman Lundberg & Woessner, P.A.

(57) ABSTRACT

A transient absorption spectrometer using excitation by a pulse current, including: a central control unit; a pulse generator configured to generate a current pulse signal under an action of a first trigger signal sent by the central control unit, where the current pulse signal is applied to a sample to be tested such that the sample is in a non-luminous excited state for single-carrier injection or a luminous excited state for luminescence in which an electroluminescent signal is generated; a laser configured to emit a pulsed optical signal under an action of a second trigger signal sent by the central control unit; a beam splitter disposed in a light-exiting direction of the laser, and configured to split the pulsed optical signal into a detection optical signal and a reference optical signal, where the detection optical signal irradiates the sample to be tested to generate a detected optical signal; a data acquisition unit configured to acquire, under an action of a third trigger signal and a fourth trigger signal sent by the central control unit, the electroluminescent signal, the detected optical signal and the reference optical signal, and
(Continued)

perform a processing to obtain electrical signal data indicating, at a single time instant, absorption intensities of the sample for optical signals of different wavelengths; and a data processing and imaging unit configured to process the electrical signal data to obtain a transient absorption signal of the sample to be tested and perform imaging.

3 Claims, 2 Drawing Sheets

(56) References Cited

U.S. PATENT DOCUMENTS

| | | | |
|---|---|---|---|
| 2002/0166777 A1 | 11/2002 | Gramann et al. | |
| 2008/0186486 A1* | 8/2008 | Gusev | G01N 21/636 |
| | | | 356/318 |
| 2013/0034115 A1 | 2/2013 | Prawiharjo et al. | |
| 2013/0057862 A1* | 3/2013 | Cho | G01N 21/66 |
| | | | 356/402 |

FOREIGN PATENT DOCUMENTS

| | | |
|---|---|---|
| CN | 110376125 A | 10/2019 |
| CN | 111486955 A | 8/2020 |
| CN | 111537466 A | 8/2020 |
| JP | 2013525783 A | 6/2013 |
| WO | WO-2002075286 | 9/2002 |

OTHER PUBLICATIONS

"International Application Serial No. PCT/CN2021/071264, International Search Report dated Jul. 27, 2021", w/ English Translation, (Jul. 27, 2021), 6 pgs.

"International Application Serial No. PCT/CN2021/071264, Written Opinion dated Jul. 27, 2021", (Jul. 27, 2021), 4 pgs.

* cited by examiner

TRANSIENT ABSORPTION SPECTROMETER USING EXCITATION BY PULSE CURRENT

PRIORITY APPLICATIONS

This application is a U.S. National Stage Filing under 35 U.S.C. § 371 from International Application No. PCT/CN2021/071264, filed on Jan. 12, 2021, and published as WO2022/121082 on Jun. 16, 2022, which claims the benefit of priority to Chinese Application No. 202011470295.0, filed on Dec. 11, 2020; the benefit of priority of each of which is hereby claimed herein, and which applications and publication are hereby incorporated herein by reference in their entireties.

TECHNICAL FIELD

The present disclosure relates to a field of optical measurement technology, and in particular, to a transient absorption spectrometer using excitation by a pulse current.

BACKGROUND

An existing transient absorption technology is a pump-probe measurement technology based on a time-difference, which is widely used. This technology uses a beam of pulsed laser to excite a sample to be tested to change its physical or chemical properties, so as to change the absorption coefficient of the sample while using another beam of detection light to detect this change. The detection light may be a monochromatic light or a white light. By changing a time delay between a pumping light and the detection light, transient absorption spectra at different time instants after the sample is excited by the light may be obtained. After analyzing a generation and attenuation of a transient signal, corresponding dynamics information is obtained. An advantage of transient absorption spectrum technology is that even if the sample does not emit light, its excited state dynamics may be studied.

However, due to a lack of related technologies, it is impossible to measure the dynamics information of a carrier excited by electro-excitation comprehensively and accurately.

SUMMARY

The present disclosure provides a transient absorption spectrometer using excitation by a pulse current, including: a central control unit configured to send a trigger signal; a pulse generator configured to generate a current pulse signal under an action of a first trigger signal sent by the central control unit, where the current pulse signal is applied to a sample to be tested such that the sample is in a non-luminous excited state for single-carrier injection or an electroluminescent signal is generated; a laser configured to emit a pulsed optical signal under an action of a second trigger signal sent by the central control unit; a beam splitter disposed in a light-exiting direction of the laser, and configured to split the pulsed optical signal into a detection optical signal and a reference optical signal, where the detection optical signal irradiates the sample to be tested to generate a detected optical signal; a data acquisition unit configured to acquire, under an action of a third trigger signal and a fourth trigger signal sent by the central control unit, the electroluminescent signal, the detected optical signal and the reference optical signal, and perform a processing to obtain electrical signal data indicating, at a single time instant, absorption intensities of the sample for optical signals of different wavelengths; and a data processing and imaging unit configured to process the electrical signal data to obtain a transient absorption signal of the sample to be tested and perform imaging.

Optionally, the sample to be tested is electro-excited, and the sample to be tested is placed on a sample table and connected to an output port of the pulse generator, and where the current pulse signal is applied to the sample to be tested such that the sample is in the non-luminous excited state for single-carrier injection or a luminous excited state by electro-excitation in which an electroluminescent signal is generated.

Optionally, the laser is a monochromatic light laser or a white light laser.

Optionally, a frequency of the second trigger signal is 3/2 times of a frequency of the first trigger signal, a frequency of the third trigger signal is 3 times of the frequency of the first trigger signal, and a frequency of the fourth trigger signal is 3 times of the frequency of the first trigger signal.

Optionally, the sample to be tested is excited by using a current pulse signal having a frequency of ½ times of the frequency of the first trigger signal sent by the central control unit, a first current value of the sample to be tested in the excited state by electro-excitation without using irradiation by the detection optical signal is measured by an ammeter, a second current value of the sample to be tested in the excited state by electro-excitation using irradiation by the detection optical signal is measured by the ammeter, and a shape and a sequence of current pulses are adjusted based on a ratio of the first current value to the second current value, such that a ratio of an amplitude of an even-numbered current pulse signal to an amplitude of an odd-numbered current pulse signal is equal to the ratio of the first current value to the second current value.

Optionally, the data acquisition unit includes: a group of monochromators including a first monochromator and a second monochromator, where the first monochromator is configured to receive the electroluminescent signal and/or the detected optical signal, and split a received optical signal into optical signals of different wavelengths; and the second monochromator is configured to receive the reference optical signal and split the reference optical signal into optical signals of different wavelengths; a group of CCDs including a first CCD and a second CCD, where the first CCD is configured to process the optical signals of different wavelengths processed by the first monochromator into electrical signal data indicating absorption intensities of the sample for the optical signals of different wavelengths, and the second CCD is configured to process the optical signals of different wavelengths processed by the second monochromator into electrical signal data indicating absorption intensities of the sample for the optical signals of different wavelengths; and a counter configured to count and store the electrical signal.

Optionally, the central control unit is provided with a time-delay device, and the time-delay device is implemented by an optical delay table or an electronics board card, and where the time-delay device is configured to adjust a time difference between the first trigger signal and the second trigger signal, so as to test information of an absorption signal of the sample to be tested changing over time, and where the time-delay device is configured to regulate the third trigger signal and the fourth trigger signal and send the third trigger signal and the fourth trigger signal in a time-sharing manner.

Optionally, the reference optical signal is not in contact with the sample to be tested and is configured to eliminate an influence of a fluctuation of the detection optical signal on a measurement.

Optionally, the data processing and imaging unit obtains the transient absorption signal ΔOD of the sample to be tested by using equation:

$$I_{pump-on} = I_{pump+r} - I_{e+pe};$$

$$\frac{I^r_{pump-off}}{I^r_{pump-on}} = \frac{I_{0_{pump-off}}}{I_{0_{pump-on}}};$$

$$OD = \lg\frac{I_0}{I};$$

$$\Delta OD = \left(\lg\frac{I_0}{I}\right)_{pump-on} - \left(\lg\frac{I_0}{I}\right)_{pump-off} = \lg\left(\frac{I_{pump-off}}{I_{pump-on}} \times \frac{I^r_{pump-on}}{I^r_{pump-off}}\right),$$

where $$I^r_{pump-off}$$

refers to a light intensity of a reference light without using excitation by the current pulse signal, $$I^r_{pump-on}$$

refers to a light intensity of the reference light using excitation by the current pulse signal, $I_{pump-off}$ refers to light intensity data of a detection light without using excitation by the current pulse signal, $I_{pump-on}$ refers to light intensity data of the detection light using excitation by the current pulse signal, that is $I_{pump-off}$ refers to data acquired by the counter for a $(6n+4)^{th}$ time; $I_{0_{pump-off}}$ refers to a light intensity of the pulsed optical signal without using excitation by the current pulse signal, refers to a light intensity of the pulsed optical signal using excitation by the current pulse signal, $I_{pump+r}$ refers to signal data acquired by the data acquisition unit using excitation by the current pulse signal and using irradiation by the detection light, that is data acquired by the counter for a $(6n+1)^{th}$ time, $I_{e+pe}$ refers to the electroluminescent signal data acquired by the data acquisition unit after an photoconductive effect is calculated, that is data acquired by the counter for a $(6n+3)^{th}$ time, where n is an integer starting from 0, OD is an absorbance, $I_0$ refers to a light intensity of the detection optical signal before passing through the sample, and I refers to a light intensity of the detection optical signal after passing through the sample.

The present disclosure provides a transient absorption spectrometer using excitation by a pulse current, which may alleviate technical problems such as dynamics information of the carrier excited by electro-excitation may not be effectively measured in existing technologies. Contents of the test are more comprehensive, and dynamics information of the generation and the attenuation of transient components of the sample to be tested and an excited state dynamics information may be tested. A luminescent signal of the sample excited by the current pulse signal and an electroluminescent enhanced signal caused by a photoconductive effect of the detection light are excluded, such that the measured transient absorption signal is more accurate, and the test of the dynamics information of the carrier of the sample to be tested is more accurate and intuitive. The pump-probe measurement technology using excitation by a direct current pulse is more widely used, which may be used for testing and analysis in fields such as LEDs or solar cells.

BRIEF DESCRIPTION OF THE DRAWINGS

Accompanying drawings are used for providing a further understanding of the present disclosure and constituted a part of the description, and are used to illustrate the present disclosure with specific embodiments below, but are not constituted a limitation on the present disclosure, in which.

DETAILED DESCRIPTION OF EMBODIMENTS

Figure 1:
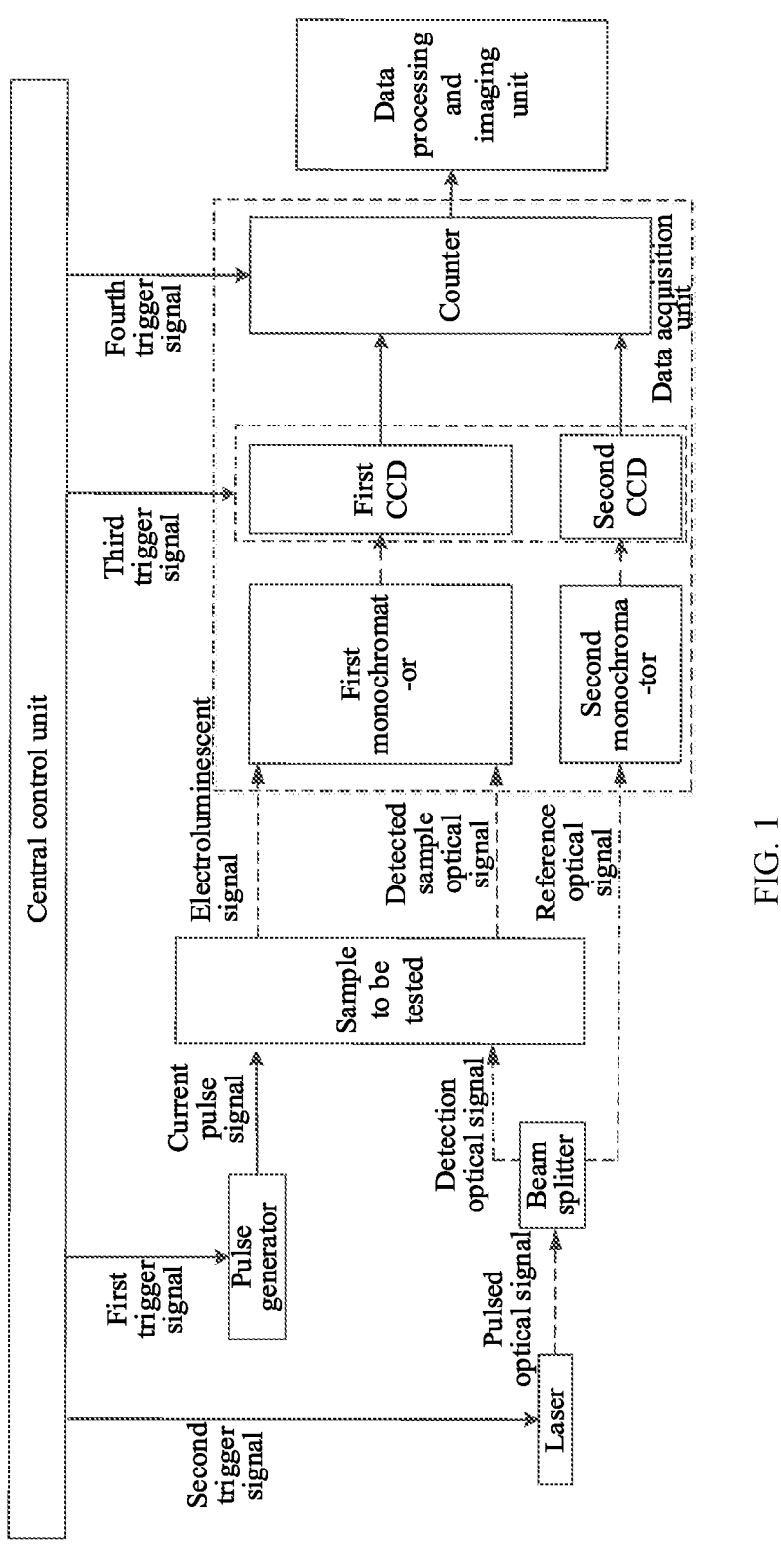
FIG. 1 shows a schematic diagram of a composition of a transient absorption spectrometer using excitation by a pulse current according to an embodiment of the present disclosure.

Different from an existing pump-probe transient absorption spectrometer using a light to excite a sample, the present disclosure provides a transient absorption spectrometer using excitation by a pulse current, which uses a current pulse signal as a pumping source, combines an optical or electronic delayed detection light, acquires dynamics information of a carrier in the sample to be tested after being excited by electro-excitation, establish a pulse current pumping-optical detection transient absorption spectrometer, which is suitable for studying mobility and a concentration of defects of devices such as LEDs, electroluminescence lasers, light detectors and solar cells. Relaxation information of a carrier excited by the current pulse signal may be tested, relaxation information of an exciton may be tested, and relaxation information of a carrier of an injected single-electron or an injected single-hole may be tested. It may be used to measure an absorption spectrum and dynamics information of the carrier corresponding to a generation and an attenuation of transient components of the sample to be tested. Related information such as excited state energy transmission, charge transfer or electro-phonon coupling in the sample excited by a current may be detected by an analysis device.

In a process of implementing the present disclosure, the inventors found that an operating principle of the existing transient absorption spectrometer based on the transient absorption spectrum technology is as follows: a beam of pulsed laser as a pumping light is incident on a sample to excite the sample from a ground state to an excited state, and another beam of pulsed monochromatic light or white light is delayed by an optical delay platform or an electronic board card and then incident as the detection light on a same position of the sample. By controlling a delay time of the detection light relative to the pumping light, a change of an absorption spectrum of the sample with the delay time may be detected, so as to obtain relaxation information of the sample in excited state. However, the existing spectrometer described above is limited by its light excitation mechanism, the carrier may only be generated in a light absorption layer, and the relaxation information of electron-hole pairs may only be measured. It is impossible to test relaxation information of the carrier injected or transferred by electrodes, and it is also impossible to test relaxation information of the carrier during a single-electron injection or a single-hole injection. However, in a research of devices such as LEDs, electroluminescence lasers, light detectors and solar cells, the relaxation information of the carrier described above may reflect performances of the devices from different aspects, which is equally important and indispensable. Therefore, the present disclosure provides a transient absorption spectrometer using excitation by a current pulse signal. The transient absorption spectrometer using excitation by the current pulse signal is used to acquire an electroluminescent signal after considering a photoconductive effect, a detection optical signal pumped by using a current pulse signal, and a detection optical signal pumped without using a current pulse signal. After data processing, the electroluminescent signal generated using excitation by a current pulse and an increment of the electroluminescence intensity caused by a current increase which is caused by the photoconductive effect of the detection light on the device may be excluded.

The present disclosure is characterized in that a current pulse signal is used for excitation, and a transient absorption signal of a sample is detected using monochromatic light or white light.

In order to make purpose, technical solution, and advantages of the present disclosure clearer, the present disclosure will be further described in detail below in conjunction with specific embodiments and with reference to accompanying drawings.

In embodiments of the present disclosure, a transient absorption spectrometer using excitation by a pulse current is provided, as shown in FIG. 1. The transient absorption spectrometer includes: a central control unit; a pulse generator; a laser; a beam splitter; a data acquisition unit; and a data processing and imaging unit.

The central control unit is used to send a trigger signal.

In embodiments of the present disclosure, the transient absorption spectrometer further includes an ammeter, and the ammeter is used to test a real current of a sample to be tested.

Figure 2:
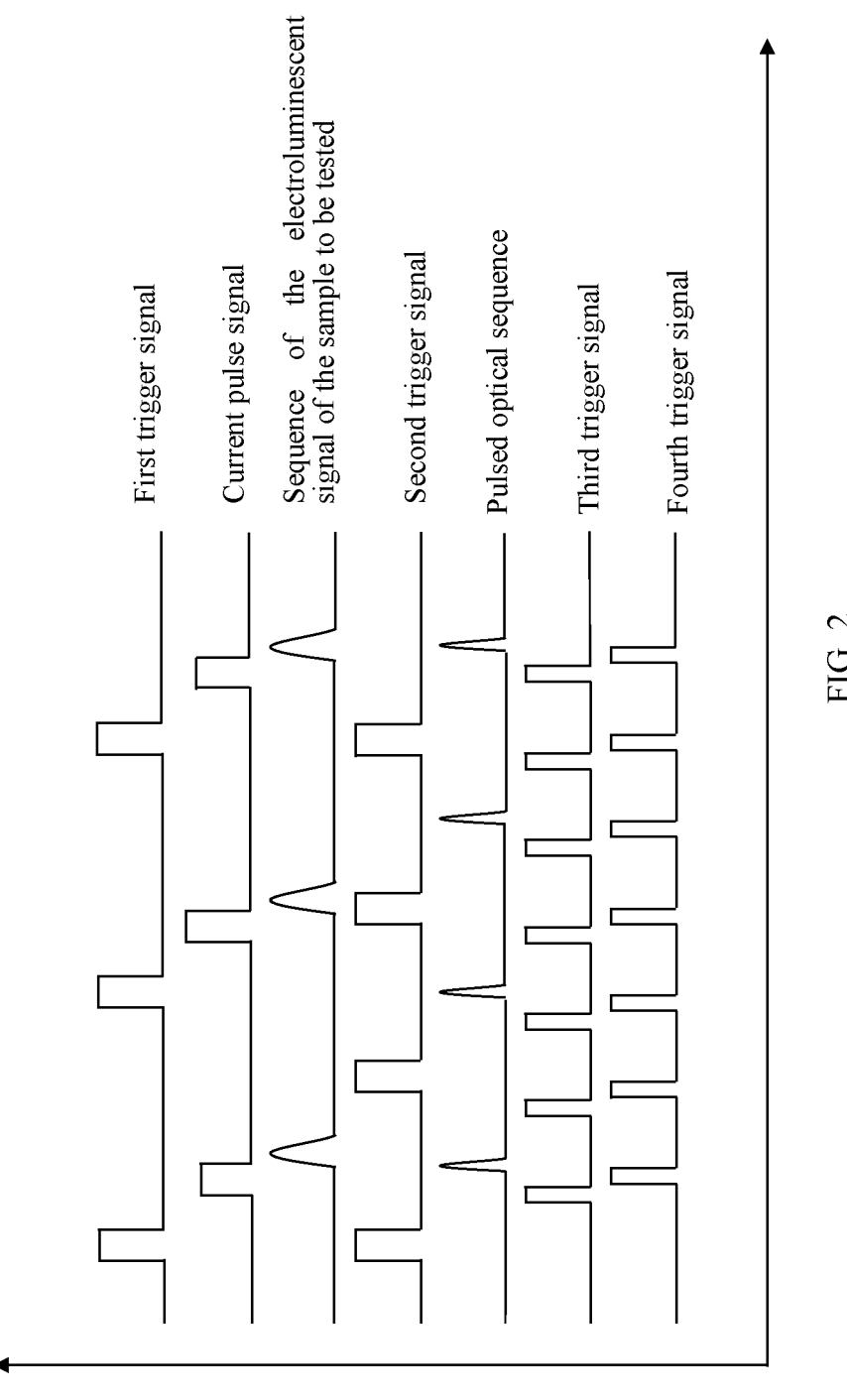
FIG. 2 shows a pulse sequence diagram of a transient absorption spectrometer using excitation by a pulse current according to an embodiment of the present disclosure.

In embodiments of the present disclosure, the sample to be tested is excited by using a current pulse signal having a frequency of ½ times of the frequency of a first trigger signal sent by the central control unit, a first current value of the sample to be tested in the excited state by electro-excitation without using irradiation by the detection optical signal is measured by the ammeter, a second current value of the sample to be tested in the excited state by electro-excitation using irradiation by the detection optical signal is measured by the ammeter, and a shape and a sequence of current pulses are adjusted based on a ratio (comparison result) of the first current value to the second current value, such that a ratio of an amplitude or amplitudes of an even-numbered current pulse signal or even-numbered current pulse signals to an amplitude or amplitudes of an odd-numbered current pulse signal or odd-numbered current pulse signals is equal to the ratio of the first current value to the second current value. A pumping (current pulse signal) for measuring the transient absorption of the sample to be tested is generated by a pulse generator. The shape of the current pulse is shown as FIG. 2.

The pulse generator is used to generate a current pulse signal under an action of the first trigger signal sent by the central control unit. The current pulse signal is applied to the sample to be tested, such that the sample is in a non-luminous excited state for single-carrier injection or an electroluminescent signal is generated.

The laser is used to emit a pulsed optical signal under an action of a second trigger signal sent by the central control unit.

The beam splitter is disposed in a light-exiting direction of the laser, and used to split the pulsed optical signal into a detection optical signal and a reference optical signal, where the detection optical signal irradiates the sample to be tested to generate a detected optical signal.

The data acquisition unit is used to acquire, under an action of a third trigger signal and a fourth trigger signal sent by the central control unit, the electroluminescent signal, the detected optical signal and the reference optical signal, and perform a processing to obtain electrical signal data indicating, at a single time instant, absorption intensities of the sample for optical signals of different wavelengths.

The data processing and imaging unit is used to process the electrical signal data to obtain a transient absorption signal of the sample to be tested and perform imaging.

The pulse generator may generate, under the action of the first trigger signal, square or other shaped current pulse signals of different amplitudes, pulse periods, and frequencies to excite the sample to be tested.

The sample to be tested is an electro-excited sample, which is placed on a sample table and connected to an output port of the pulse generator. The current pulse signal is applied to the sample to be tested, such that the sample is in the non-luminous excited state for single-carrier injection or a luminous excited state by electro-excitation in which an electroluminescent signal is generated.

The laser is a monochromatic light laser or a white light laser.

The reference optical signal is used to eliminate an influence of a fluctuation of the detection optical signal on a measurement.

A frequency of the second trigger signal is 3/2 times of a frequency of the first trigger signal.

A frequency of the third trigger signal is 3 times of the frequency of the first trigger signal. A frequency of the fourth trigger signal is 3 times of the frequency of the first trigger signal.

The data acquisition unit includes: a group of monochromators including a first monochromator and a second monochromator, where the first monochromator is used to receive the electroluminescent signal and/or the detected optical signal, and split a received optical signal into optical signals of different wavelengths; and the second monochromator is used to receive the reference optical signal and split the reference optical signal into optical signals of different wavelengths; a group of Charge-coupled Devices (CCDs) including a first CCD and a second CCD, where the first CCD is used to process the optical signals of different wavelengths processed by the first monochromator into electrical signal data indicating absorption intensities of the sample for the optical signals of different wavelengths, and the second CCD is used to process the optical signals of different wavelengths processed by the second monochromator into electrical signal data indicating absorption intensities of the sample for the optical signals of different wavelengths; and a counter used to count and store the electrical signal.

In embodiments of the present disclosure, the data acquisition unit further includes a focusing objective lens and an optical fiber.

The central control unit is provided with a time-delay device, and the time-delay device is implemented by an optical delay table or an electronics board card. The time-delay device is used to adjust a time difference between the first trigger signal (or current pulse signal) and the second trigger signal (or pulsed optical signal), so as to test information of an absorption signal of the sample to be tested changing over time. The time-delay device is used to regulate the third trigger signal and the fourth trigger signal and send the third trigger signal and the fourth trigger signal in a time-sharing manner, and coordinate operations of various components.

It takes time for the detection light to reach the sample, and there is a time difference between a time instant when the current pulse signal reaches the sample and a time instant when the sample is excited. This time difference is adjusted so that a time instant when the sample is detected by a real optical signal at the start of the measurement is earlier than a time instant when the sample is excited by a real pulsed electrical signal.

In embodiments of the present disclosure, a monochromatic or white light detection laser is triggered by a trigger signal having a frequency of 3/2 times of a frequency of the current pulse, and the emitted pulsed optical signal is split into two beams. One beam is used as the detection light to irradiate the sample to be tested, and the other beam may be used as a reference light. As the reference optical signal is not in contact with the sample to be tested, the reference optical signal may be used to eliminate a problem of the monochromatic or white light shaking over time.

In embodiments of the present disclosure, the electrical signal data is processed by the data processing and imaging unit, and valid data is formed by comparing with the reference optical signal to exclude an influence of a shaking of the detection optical signal, so as to obtain a map of a three-dimensional absorption intensity of the sample to be tested changing over wavelength and time.

The electroluminescent signal after a photoconductive effect is considered and the detected optical signal acquired by the data acquisition unit are split by the first monochromator and simultaneously irradiated on the first CCD. The reference optical signal is split by the second monochromator and irradiated on the second CCD. The first CCD and the second CCD receive a third trigger signal from the central control unit to start acquiring an image, and convert the image into an electrical signal and transmit the electrical signal to the counter. The counter receives a fourth trigger signal from the central control unit and starts counting and storing the electrical signal.

In embodiments of the present disclosure, the frequency of the second trigger signal, which is used to trigger the laser to emit the detection light and the reference light, sent by the central control unit is 3/2 times of the frequency of the current pulse emitted by the pulse generator triggered by the first trigger signal. Therefore, data acquired by the counter for a $(6n+1)^{th}$ acquisition time from the start is used as data using excitation by the current pulse signal and using irradiation by the detection light signal, data acquired for a $(6n+4)^{th}$ acquisition time is used as data using irradiation by the detection light signal and without using excitation by the current pulse signal, and data acquired for a $(6n+3)^{th}$ acquisition time is used as electroluminescent signal data after the photoconductive effect is considered, where n is an integer starting from 0, and the transient absorption signal of the sample to be tested excited by the current pulse signal is obtained by the data processing and imaging unit by using equation:

$$I_{pump-on} = I_{pump+r} - I_{e+pe};$$

$$\frac{I^r_{pump-off}}{I^r_{pump-on}} = \frac{I_{0\,pump-off}}{I_{0\,pump-on}};$$

$$OD = 1g\frac{I_0}{I};$$

-continued $$\Delta OD = \left(1g\frac{I_0}{I}\right)_{pump-on} - \left(1g\frac{I_0}{I}\right)_{pump-off} = 1g\left(\frac{I_{pump-off}}{I_{pump-on}} \times \frac{I^r_{pump-on}}{I^r_{pump-off}}\right);$$

where $$I^r_{pump-off}$$

refers to a light intensity of a reference light without using excitation by the current pulse signal, $$I^r_{pump-on}$$

refers to a light intensity of the reference light using excitation by the current pulse signal, $I_{0\,pump-off}$ refers to a light intensity of the pulsed optical signal (monochromatic or white light) without using excitation by the current pulse signal, $I_{0\,pump-on}$ refers to a light intensity of the pulsed optical signal (monochromatic or white light) using excitation by the current pulse signal, $I_{pump+r}$ refers to signal intensity using excitation by the current pulse and using irradiation by the reference light, that is data acquired by the counter for a $(6n+1)^{th}$ time, $L_{e+pe}$ refers to the electroluminescent signal data acquired by an acquisition terminal after a photoconductive effect is calculated, that is data acquired by the counter for a $(6n+3)^{th}$ time, $I_{pump-off}$ refers to a light intensity of a detection light without using excitation by the current pulse signal, $I_{pump-on}$ refers to a light intensity of the detection light using excitation by the current pulse signal, $I_{pump-off}$ refers to data acquired by the counter for a $(6n+4)^{th}$ time, where OD is an absorbance, $I_0$ refers to a light intensity of the detection optical signal before passing through the sample, and I refers to a light intensity of the detection optical signal after passing through the sample.

Absorption data of different wavelengths obtained at one time instant is described above. A time difference between the detection light and the pumped current pulse signal is achieved by the delay device in the central control unit, and steps of measuring the transient absorption signal are performed, so as to obtain absorption intensity data of different wavelengths and absorption intensity data changing over time. The data processing and imaging unit draws a three-dimensional image of the absorption intensity of the sample to be tested changing over time and absorption intensities of the sample to be tested of different wavelengths.

Embodiments of the present disclosure have been described in detail with reference to the accompanying drawings. It should be noted that, in the accompanying drawings or in the text of the specification, implementations that are not shown or described are forms known to those of ordinary skilled in the art, and are not described in detail. In addition, the above definitions of each element and method are not limited to the various specific structures, shapes or methods mentioned in embodiments, and those of ordinary skilled in the art may easily modify or replace them.

Based on the above description, those of ordinary skilled in the art should have a clear understanding of the transient absorption spectrometer of the present disclosure.

In summary, the present disclosure provides a transient absorption spectrometer using excitation by a pulse current, which uses the pulse generator to provide the current pulse signal as the pumping source to excite the sample to be tested to emit the electroluminescent signal or to be in the non-luminous excited state for single-carrier injection; uses the monochromatic light or white light laser whose frequency is 3/2 times of the frequency of the current pulse signal as the detection optical signal and the reference optical signal; adjusts the delay between the current pulse signal and the detection optical signal by the delay device; triggers the CCD and the counter in the data acquisition unit by using the trigger signals whose frequencies are 3 times of the frequency of the current pulse; acquires, by the data acquisition unit, the detection optical signal including the electroluminescent signal using excitation by the current pulse, the electroluminescent signal after the photoconductive effect is calculated, and the detection optical signal without using excitation by the pumped pulse current; and processes, by the data processing and imaging unit, the acquired signal to form the three-dimensional image of absorption changing over time and wavelength. The transient absorption spectrometer using excitation by the pulse current may exclude the electroluminescent signal of the sample caused by luminescence under an excitation by the pulse current and the optical signal caused by the additional increased current which is caused by the photoconductive effect, and measure dynamics of electrically injected single-electron, single-hole or electron-hole pairs.

Those of ordinary skilled in the art may clearly understand that, for the convenience and brevity of the description, the division of the above-mentioned functional devices is only used as an example for illustration. In practice, the above functions may be achieved by different functional modules as desired, that is, the internal structure of the chip is divided into different functional modules to achieve all or part of the functions described above. The specific operating process of the chip described above may refer to the corresponding process in the foregoing method embodiments, which are not repeated here.

Finally, it should be noted that the above embodiments are only used to illustrate the technical solutions of the present disclosure, but not to limit them. Although the present disclosure has been described in detail with reference to the foregoing embodiments, those of ordinary skilled in the art should understand that it is still possible to modify the technical solutions described in the foregoing embodiments, or perform equivalent replacements for some or all of the technical features. In a case of non-conflicting, the features in embodiments of the present disclosure may be arbitrarily combined. These modifications or replacements do not make the essence of the corresponding technical solutions depart from the scope of the technical solutions of embodiments of the present disclosure.

What is claimed is:

1. A transient absorption spectrometer using excitation by a pulse current, comprising:
   a central control unit configured to send a trigger signal;
   a pulse generator configured to generate a current pulse signal under an action of a first trigger signal sent by the central control unit, wherein the current pulse signal is applied to a sample to be tested such that the sample is in a non-luminous excited state for single-carrier injection or a luminous excited state for luminescence in which an electroluminescent signal is generated;
   a laser configured to emit a pulsed optical signal under an action of a second trigger signal sent by the central control unit;
   a beam splitter disposed in a light-exiting direction of the laser, and configured to split the pulsed optical signal into a detection optical signal and a reference optical signal, wherein the detection optical signal irradiates the sample to be tested to generate a detected optical signal;
   a data acquisition unit configured to acquire, under an action of a third trigger signal and a fourth trigger signal sent by the central control unit, the electroluminescent signal, the detected optical signal and the reference optical signal regarded as a process to obtain electrical signal data indicating, at a single time instant, absorption intensities of the sample for optical signals of different wavelengths; and
   a data processing and imaging unit configured to process the electrical signal data to obtain a transient absorption signal of the sample to be tested and perform imaging,
   wherein the sample to be tested is an electro-excited sample, and the sample to be tested is placed on a sample table and connected to an output port of the pulse generator,
   wherein the current pulse signal is applied to the sample to be tested such that the sample is in the non-luminous excited state for single-carrier injection or a luminous excited state by electro-excitation in which an electroluminescent signal is generated, and
   wherein the sample to be tested is excited by using a current pulse signal having a frequency of ½ times of the frequency of the first trigger signal sent by the central control unit,
   a first current value of the sample to be tested in the excited state by electro-excitation without using irradiation by the detection optical signal is measured by an ammeter,
   a second current value of the sample to be tested in the excited state by electro-excitation using irradiation by the detection optical signal is measured by the ammeter, and
   a shape and a sequence of current pulses are adjusted based on a ratio of the first current value to the second current value, such that a ratio of an amplitude of an even-numbered current pulse signal to an amplitude of an odd-numbered current pulse signal is equal to the ratio of the first current value to the second current value.

2. The transient absorption spectrometer of claim 1, wherein the laser is a monochromatic light laser or a white light laser.

3. The transient absorption spectrometer of claim 1, wherein a frequency of the second trigger signal is 3/2 times of a frequency of the first trigger signal, a frequency of the third trigger signal is 3 times of the frequency of the first trigger signal, and a frequency of the fourth trigger signal is 3 times of the frequency of the first trigger signal.

* * * * *